Figure 1:
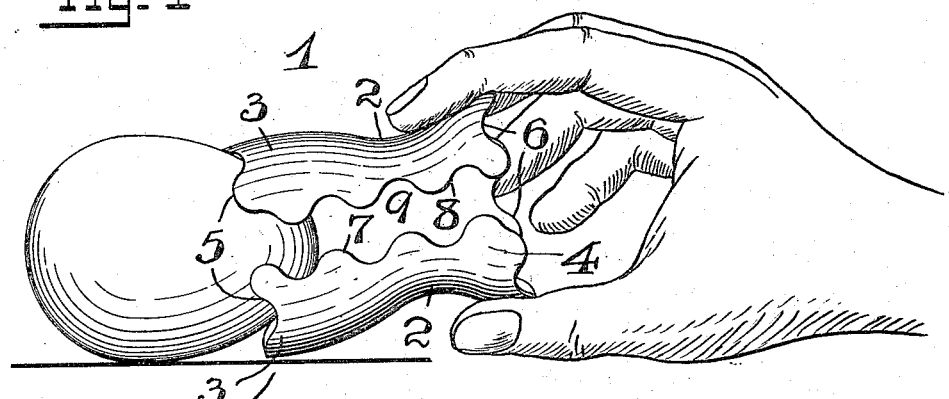

W. M. BROWN.
EGG GRIP.
APPLICATION FILED MAR. 1, 1910. RENEWED JUNE 11, 1915.

1,156,459. Patented Oct. 12, 1915.

WITNESSES:
Fredk. W. Fraentzel
Anna H. Acter

INVENTOR:
William M. Brown,
BY Fraentzel and Richards,
ATTORNEYS.

COLUMBIA PLANOGRAPH CO., WASHINGTON, D. C.

UNITED STATES PATENT OFFICE.

WILLIAM M. BROWN, OF NEWARK, NEW JERSEY.

EGG-GRIP.

1,156,459.  Specification of Letters Patent.  Patented Oct. 12, 1915.

Application filed March 1, 1910, Serial No. 546,670. Renewed June 11, 1915. Serial No. 33,626.

*To all whom it may concern:*

Be it known that I, WILLIAM M. BROWN, a citizen of the United States, residing at Newark, in the county of Essex and State of New Jersey, have invented certain new and useful Improvements in Egg-Grips; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in egg grips and egg holders; and the invention relates, more particularly, to a novel device for picking up and gripping hot eggs, the device being equally adapted for use as an egg cup, or a napkin ring or holder.

The present invention, therefore, has for its principal objects to provide a novel, neat and simply constructed, as well as an ornate device or implement, which can be readily used for picking up hot eggs, and by means of the device positively gripping the egg and holding it in the device, so as to enable a person to readily break the shell of the egg, and the egg eaten from the device; or, the device being used to hold the egg while feeding the egg-contents to a child or sick person.

The invention has for its further object to provide a device for gripping hot eggs from a surface, such as a plate, saucer, table, or the like, the device being made from a single piece of metal, or other suitable material, having great resiliency, so that when an open end-portion of the device is slipped over the end-portion of an egg, the device becomes self-acting or automatic in gripping the egg, and without any further manual manipulation positively holds the egg against any accidental displacement from the egg grip.

A further object of this invention is to provide a novel device which can be used as an egg grip, an egg cup, or a napkin ring, and in which there are no assembled parts forming hinged joints which can readily get out of order and which are difficult to keep clean, and for that reason are unsanitary.

Other objects of this invention not at this time more particularly enumerated will be clearly understood from the detailed description of my present invention.

With the various objects of the present invention in view, the said invention consists, primarily, in the novel egg grip, as well as in the peculiar arrangement and construction of the parts thereof, all of which will be more fully set forth in the following specification and then finally embodied in the clauses of the claims which are appended to and which form an essential part of this specification.

The invention is clearly illustrated in the accompanying drawings, in which:—

Figure 2:
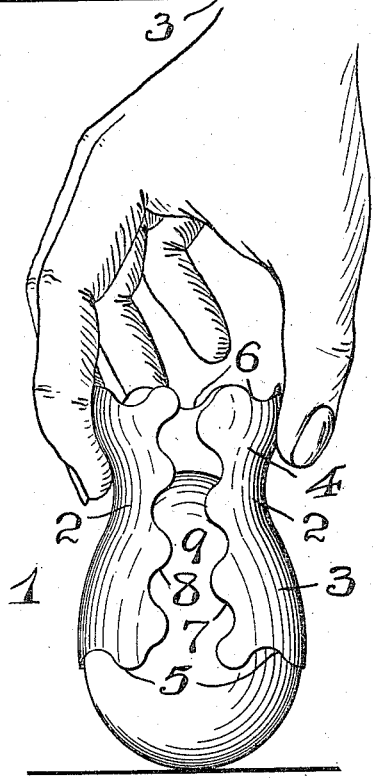
Figure 3:
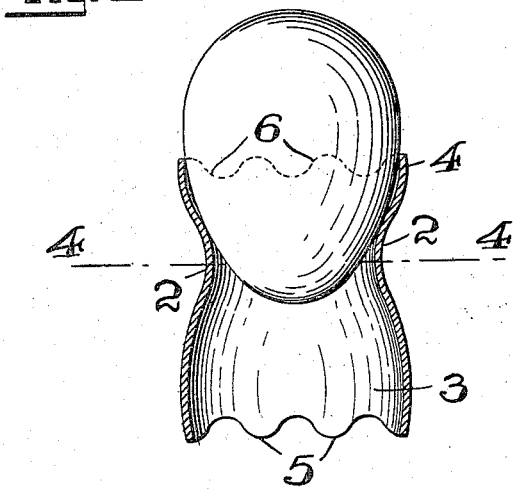
Figure 4:
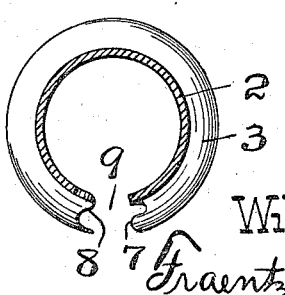

Figure 1 is a pictorial representation of an egg grip made according to and embodying the principles of the present invention, an egg and a hand, showing the first step in the operation of picking up a hot egg; and Fig. 2 is a similar view of the same parts, showing the positions of the egg, the egg grip, and the hand in pushing or forcing the egg grip into its final gripping relation with the egg. Fig. 3 is a vertical sectional representation of an egg grip, showing in connection therewith and in elevation an egg gripped or retained in the smaller end-portion of the device; and Fig. 4 is a horizontal section of the egg grip, said section being taken on line 4—4 in said Fig. 3, with the representation of the egg, however, being omitted from said view.

Similar characters of reference are employed in all of the above described views, to indicate corresponding parts.

Referring now to the several figures of the drawings, the reference-character 1 indicates a complete egg-grip showing one embodiment of the present invention, said device being made from a single piece of spring-metal, or other suitable material having great resiliency, the said piece of metal or other material used being made in the form of a tubular body formed with a contracted part 2 and the substantially outwardly flaring end-portions or members 3 and 4. The marginal edge-portions 5, 6, 7 and 8 may be of any desirable configuration, as will be clearly evident, and the piece of spring-metal or other suitable resilient material of which the device is made, being of such tubular conformation, so that a longitudinally extending open space, as 9, will be provided. In this manner, an open cup shaped device is produced, having oppositely located open end portions, said open end-portion forming suitable gripping or clamping members, either one of which may be employed in the manner to be presently set forth for the picking up and gripping of an egg.

In Figs. 1 and 2 of the drawings, I have shown one manner of slipping or forcing one of these open-end gripping or clamping members over the end portion and upon a hot egg, the spring-like action or resiliency of the split portions of the said gripping or clamping member being such that the egg can be readily and quickly lifted from a dish or the table without handling the hot egg, and the egg being positively gripped so that it can not be accidentally displaced or fall from the gripping or clamping member, no matter in what position the egg grip is held in the hand.

In its use of the device it is not necessary to touch the egg with the hand, so that eggs can be served extremely hot. Furthermore, the inner and contracted curved surface-portions of the device form a suitable seat upon which portions of the egg rest so that a portion of the egg will extend beyond the marginal end portion of the gripping or clamping member, and that a great portion of the shell of the gripped egg can be reached, for the purpose of breaking it away, and for the removal of the meat of the egg, as will be clearly evident. Furthermore, the marginal end edges of the device are such that when a gripped egg is picked up, one end of the device can be placed upon the table, thus enabling the device to be used in the manner of an egg cup, for eating the meat of the egg directly out of the shell, as will be understood from an inspection of Fig. 3 of the drawings.

If desired, the device may also be used as a napkin ring, as will be clearly evident.

As shown in the several figures of the drawings, the two gripping or clamping members may be of such conformation and size, that the one gripping or clamping member is shorter than the other gripping or clamping member which has this advantage that the egg grip is easily adapted for gripping and picking up both small and large eggs.

Ordinarily, when the device is to be used in the manner of the usual egg cup, the egg is preferably gripped by the short clamping or gripping member, as clearly shown in Fig. 3 of the drawings, so as to expose to the action of breaking the shell, a large portion of the egg; but, when the device is to be used for "spooning" the meat of the egg to a sick person, or when it is desired to break the egg into a cup, plate, or similar article, such as is used in table-service, then it is preferable to grip the egg by means of the long clamping or gripping member, in the manner indicated in said Figs. 1 and 2 of the drawings. In either case it is unnecessary to handle or touch the hot egg with the fingers, and while the device is admirably adapted for carrying and lifting about the hot egg, without the least danger of its falling from the egg grip, it can be set upon either end so as to be used as an egg cup, and the egg eaten from it, or the device can be used merely as an egg lifter and holder and held over a glass, bowl, or the like, and the egg emptied into it, so that in no case is there any inconvenience from the heat of the egg.

I claim:

1. As a new article of manufacture, an egg-grip made of a single piece element having resiliency and made in the form of a tubular body open at both ends, said ends providing egg-receiving and gripping openings, said body having a contracted part, said part forming oppositely disposed seats, and the said body being made with a longitudinally extending open part to permit spreading of either of the said end-portions of the body when the opposite open end-portion is contracted, so as to receive and grip an egg, substantially as and for the purposes set forth.

2. As a new article of manufacture, an egg-grip made of a single-piece element having resiliency and made in the form of a tubular body open at both ends, said ends providing egg-receiving and gripping openings, said body having a contracted part, said part forming oppositely disposed seats, and the said body being made with a longitudinally extending open part to permit spreading of either of the said end-portions of the body when the opposite open end-portion is contracted, and one of said end-portions being smaller than the other end-portion, so as to receive and grip eggs of different sizes, substantially as and for the purposes set forth.

In testimony, that I claim the invention set forth above I have hereunto set my hand this 28th day of February, 1910.

WILLIAM M. BROWN.

Witnesses:
FREDK. C. FRAENTZEL,
FREDK. H. W. FRAENTZEL.

Copies of this patent may be obtained for five cents each, by addressing the "Commissioner of Patents, Washington, D. C."